UNITED STATES PATENT OFFICE.

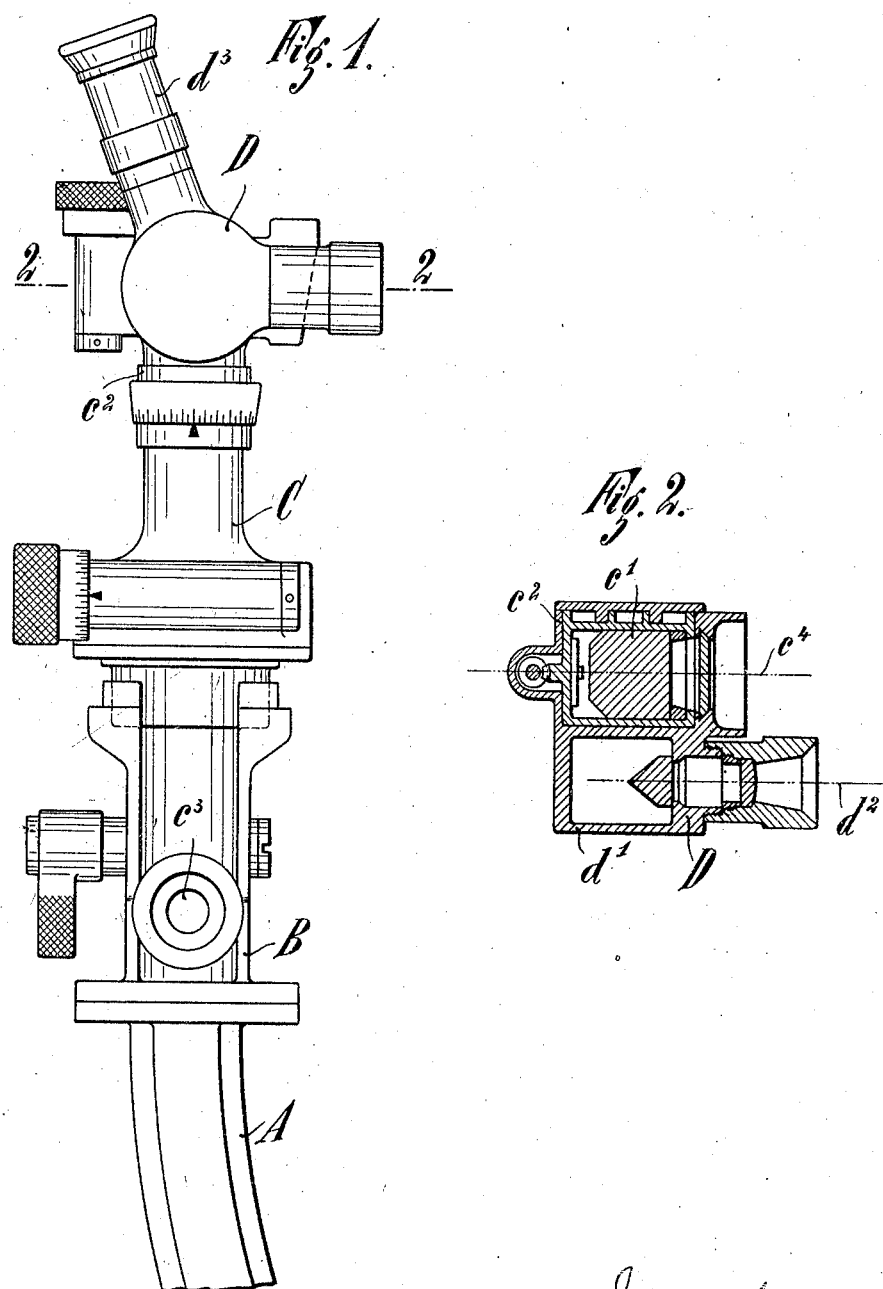

RICHARD SCHÜRMANN, OF ESSEN-ON-THE-RUHR, GERMANY, ASSIGNOR TO FRIED. KRUPP AKTIENGESELLSCHAFT, OF ESSEN-ON-THE-RUHR, GERMANY.

SIGHTING DEVICE FOR GUNS.

1,079,884.  Specification of Letters Patent.  Patented Nov. 25, 1913.

Application filed March 15, 1912. Serial No. 683,925.

*To all whom it may concern:*

Be it known that I, RICHARD SCHÜRMANN, residing at Essen-on-the-Ruhr, Germany, a subject of the Emperor of Germany, have invented a certain new and useful Improvement in Sighting Devices for Guns, of which the following is a specification.

This invention relates to a sighting device for guns having a pointing telescope and an observation telescope rigidly connected thereto, but with separate eye pieces so arranged that each may be used separately by different persons. Such sighting devices are preferably used on guns that serve for firing against very rapidly moving targets, airships for instance, in order to avoid all command transmission and the consequent retardation in firing.

The object of the invention is to provide a sighting device of the above mentioned kind which confers this character to the gun, on which it is used, that the gun may be utilized equally well in defense against airships as also in ordinary field service; and that the device, by a particularly compact construction, guarantees great convenience in its use.

The accompanying drawings represent one embodiment of the invention where—

Figure 1 shows a side elevation of a gun sight and Fig. 2, a section on line 2—2 of of Fig. 1, seen from above.

A is the elevating bar, upon which is fastened a seat B for receiving a panoramic telescope C. The panoramic telescope C, which serves as pointing telescope, consists, as usual, of a reflector prism $c^1$ (Fig. 2), as revoluble around its horizontal axis, and seated in a reflector housing $c^2$ which is turnable around its vertical axis. The panoramic telescope can be pushed down from above into the seat B and locked fast therein; and the holder is then in such a position upon the elevating bar, that the eye piece $c^3$ of the panoramic telescope stands at right angles to the plane of elevation.

The observation telescope D is directly connected with the panoramic telescope in such a manner, that the middle part $d^1$ of its housing and the reflector housing $c^2$ of the panoramic telescope constitute one piece. The sight line $d^2$ of the observation telescope (Fig. 2) is situated to one side of the sight line $c^4$ of the panoramic telescope and runs parallel therewith, when the reflector prism $c^1$ is set, so that the sight line $c^4$ lies in its middle elevation, perpendicular to the turning axis of the reflector housing $c^2$. The eye piece holder $d^3$ (Fig. 1) of the observation telescope is inclined in an upward direction to obtain a convenient view.

The use of the above described sighting device in firing against airships is accomplished in this manner, customary with sighting devices of this kind, that the gun pointer always keeps the line of sight on the target by means of the elevating and traversing gears of the gun, while the observer adjusts the sighting device for elevation and direction and also does the firing. It is for this reason desirable, in the interest of a most convenient handling of the sighting device, that the eye piece of the pointing telescope is situated as low as possible and the eye piece of the observation telescope lies comparatively high.

The use of a panoramic telescope as pointing telescope makes it now possible to obtain such favorable positions of both eye pieces, with fixed direct connection of the two telescopes; because of the peculiarly large distance between the eye piece and the reflector head of the panoramic telescope, being ample to avoid all interference between the observer and the pointer. If in place of a panoramic telescope any other kind of telescope had been chosen, a contracted arrangement of pointing and observation telescopes with an especial connecting piece would be required. By the omission of any such connecting piece, the sighting device, built in accordance with the present invention, receives a particularly compact construction. As a consequence of the fixed direct connection between the pointing and the observation telescope, an additional advantage is furthermore attained, namely this, that the parallelism of the two sight lines is to a high degree assured, which parallelism otherwise may easily be destroyed in the separate arrangement of the two telescopes, for instance by the wearing away of the adjoining surfaces at the place of connection. Still another advantage is gained by the use of a panoramic telescope, namely that the sight lines of the pointing telescope and the observation telescope, are both situated at approximately the same height, although the two eye-pieces are arranged at altogether different heights;

which so far is advantageous, that the sight opening in the protective shield may be made smaller, under otherwise similar conditions. The panoramic telescope is furthermore the only telescope that may, without changing its optical construction, be arranged on the sight carrier in such a manner, that the eye-piece takes a position at right angles to the elevating plane, which makes the sighting comfortable at any elevation. These advantages confer upon a gun, provided with the described sighting device, such qualities that make it particularly suitable as a gun for defense against airships. In consequence of the employment of a panoramic telescope as pointing telescope, such a gun at the same time also provides a field gun that can be utilized for every kind of pointing. When employed as a field gun the use of the observation sight will, naturally, however, not be required.

The utility of the sighting device, when firing against airships, will experience no limitation on account of the loss of parallelism between the two sight lines $d^2$ and $c^4$ through the displacement of the reflector prism $c^1$ in elevation as a consequence of the connection between the observation telescope with the reflector housing $c^2$ of the panoramic telescope, which housing then remains stationary. Such a displacement will, namely only be required during indirect firing and only in firing against targets on the field, when the observation telescope remains unused, as described above. It is, for this reason, practicable to fixedly connect the housing of the observation telescope with a part of the housing $c^2$ of the panoramic telescope.

I claim:—

1. A sighting device for guns comprising a pointing telescope and an observation telescope, said pointing telescope consisting of a panoramic telescope having its eye piece set at right angles with the plane of elevation, the relative position of the eye pieces for said two telescopes being so located that they may be simultaneously used by different persons.

2. A sighting device for guns comprising a pointing telescope and an observation telescope, said pointing telescope consisting of a panoramic telescope having its eye piece at right angles with the plane of elevation, a reflector in said panoramic telescope, a housing for said reflector and a housing for said observation telescope secured to the reflector housing.

3. A sighting device for guns comprising a pointing telescope and an observation telescope, said pointing telescope consisting of a panoramic telescope, and both telescopes being rigidly connected and having their eye pieces located in two planes at right angles to each other.

4. A sighting device for guns comprising a pointing telescope and an observation telescope, said pointing telescope consisting of a panoramic telescope with its eye piece at right angles with the plane of elevation, having a reflector mounted therein and revoluble around its horizontal axis and a housing for said reflector revoluble around its vertical axis.

5. A sighting device for guns comprising a pointing telescope and an observation telescope, said pointing telescope consisting of a panoramic telescope having its eye piece at right angles with the plane of elevation and a reflector mounted in the panoramic telescope and revoluble around its horizontal axis, and a housing for said reflector revoluble around its vertical axis, a housing for said observation telescope rigidly attached to said reflector housing.

6. A sighting device for guns comprising a pointing telescope and an observation telescope, said pointing telescope consisting of a panoramic telescope having a reflector mounted revolubly around its vertical and horizontal axes, the eye pieces of said telescopes being located in two planes at right angles to each other.

7. A sighting device for guns comprising a pointing telescope and an observation telescope, said pointing telescope consisting of a panoramic telescope having its eye piece set at right angles with the plane of elevation, the relative position of the eye pieces for said two telescopes being so located that they may be simultaneously used by different persons; a reflector mounted in said panoramic telescope and revoluble around its horizontal axis; a housing for said reflector revoluble around its vertical axis and a housing for said observation telescope rigidly attached to said reflector housing and partaking of its movements.

The foregoing specification signed at Barmen, Germany, this 23rd. day of February, 1912.

RICHARD SCHÜRMANN. [L. S.]

In presence of—
 HELEN NUFER,
 A. NUFER.